US012630245B2

(12) United States Patent
VanPay

(10) Patent No.: US 12,630,245 B2
(45) Date of Patent: *May 19, 2026

(54) APPARATUS AND SYSTEM FOR SEAT REPLACEMENTS WITH MULTIPLE VEHICLE POWER MODES

(71) Applicant: Rob VanPay, Green Bay, WI (US)

(72) Inventor: Rob VanPay, Green Bay, WI (US)

( * ) Notice: Subject to any disclaimer, the term of this patent is extended or adjusted under 35 U.S.C. 154(b) by 115 days.

This patent is subject to a terminal disclaimer.

(21) Appl. No.: 18/816,822

(22) Filed: Aug. 27, 2024

(65) Prior Publication Data

US 2025/0263145 A1     Aug. 21, 2025

Related U.S. Application Data

(63) Continuation of application No. 18/073,044, filed on Dec. 1, 2022, now Pat. No. 12,286,181.

(51) Int. Cl.
  *B62J 1/12*     (2006.01)
  *B62J 1/20*     (2006.01)

(52) U.S. Cl.
  CPC .. *B62J 1/12* (2013.01); *B62J 1/20* (2013.01)

(58) Field of Classification Search
  CPC ........ A47C 7/021; A47C 31/11; A61G 5/1045
  USPC ............................ 297/219.1, 219.11, DIG. 1
  See application file for complete search history.

(56) References Cited

U.S. PATENT DOCUMENTS

| | | | | | |
|---|---|---|---|---|---|
| 2,878,153 | A | * | 3/1959 | Karl | B29C 66/00 |
| | | | | | 264/DIG. 28 |
| 3,000,020 | A | * | 9/1961 | Lombard | B60N 2/42709 |
| | | | | | 5/655.9 |
| 3,587,569 | A | * | 6/1971 | Madsen | A61G 5/1043 |
| | | | | | 297/284.1 |
| 4,031,579 | A | * | 6/1977 | Lared | B64D 11/0619 |
| | | | | | 297/DIG. 5 |
| 4,132,228 | A | * | 1/1979 | Green | A47C 7/029 |
| | | | | | 297/284.3 |
| 4,819,288 | A | * | 4/1989 | Lowthian | A47C 27/148 |
| | | | | | 5/655.9 |
| 4,930,171 | A | * | 6/1990 | Frantz | A61G 5/1043 |
| | | | | | 5/653 |
| 4,930,173 | A | * | 6/1990 | Woller | A47C 27/15 |
| | | | | | 297/452.48 |
| 4,999,068 | A | * | 3/1991 | Chiarella | B62J 1/18 |
| | | | | | 297/DIG. 2 |
| 5,252,373 | A | * | 10/1993 | Ganske | B32B 27/285 |
| | | | | | 297/214 |
| 5,269,590 | A | * | 12/1993 | Carilli | B60N 2/7035 |
| | | | | | 297/216.1 |
| 5,543,213 | A | * | 8/1996 | Duvenkamp | B60N 2/5866 |
| | | | | | 428/317.1 |
| 5,791,736 | A | * | 8/1998 | Herbert | A47C 7/029 |
| | | | | | 297/452.21 |
| 6,652,034 | B1 | * | 11/2003 | Schramm | B60N 2/70 |
| | | | | | 297/452.32 |

(Continued)

*Primary Examiner* — Jose V Chen

(74) *Attorney, Agent, or Firm* — IdeaParlo Law; Anthony Whittington

(57)          ABSTRACT

A device for allowing a user to ride in a vehicle is provided. The device may include: a seat unit having one or more portions of foam materials; one or more accessory units to support the functionality of the seat unit; and one or more seat configurations to attach the seat unit to the vehicle. The device has at least one driving mode within a group: electric vehicle (EV) mode, and a hybrid vehicle (HV) mode.

20 Claims, 5 Drawing Sheets

(56) References Cited

U.S. PATENT DOCUMENTS

| | | | | |
|---|---|---|---|---|
| 7,032,967 | B2 * | 4/2006 | Pyzik | B62J 1/26 |
| | | | | 297/214 |
| 7,140,679 | B2 * | 11/2006 | Atherley | B62J 1/12 |
| | | | | 297/214 |
| 7,585,030 | B2 * | 9/2009 | Galbreath | B60N 2/70 |
| | | | | 297/DIG. 2 |
| 8,696,067 | B2 * | 4/2014 | Galbreath | B60N 2/01508 |
| | | | | 297/452.1 |
| 2003/0061663 | A1 * | 4/2003 | Lampel | A47C 27/15 |
| | | | | 428/116 |
| 2003/0204913 | A1 * | 11/2003 | McKinney | A47C 7/021 |
| | | | | 5/655.3 |
| 2004/0255385 | A1 * | 12/2004 | England | A47C 27/16 |
| | | | | 5/655.9 |
| 2006/0232111 | A1 * | 10/2006 | Hasegawa | B62J 1/12 |
| | | | | 297/219.11 |
| 2007/0294831 | A1 * | 12/2007 | Siekman | A61G 5/1043 |
| | | | | 5/652.2 |
| 2013/0257112 | A1 * | 10/2013 | Smith | A47C 7/0213 |
| | | | | 297/219.11 |
| 2015/0223607 | A1 * | 8/2015 | Ma | A47C 7/18 |
| | | | | 297/452.48 |
| 2021/0068557 | A1 * | 3/2021 | Saunders | B32B 7/08 |
| 2023/0000254 | A1 * | 1/2023 | O'Doherty | A47C 7/14 |

* cited by examiner driving mode(s): EVmode, HV mode

102

100

104 foam materials: vinyl, nylon, polyester

114

112 mesh layers, mesh frames, spring layers

APPARATUS AND SYSTEM FOR SEAT REPLACEMENTS WITH MULTIPLE VEHICLE POWER MODES

CROSS-REFERENCES TO RELATED APPLICATIONS

The present application claims the benefit of U.S. Non-Provisional application Ser. No. 18/073,044, entitled "APPARATUS AND SYSTEM FOR SEAT REPLACE-MENTS WITH MULTIPLE DRIVING MODE CAPABILI-TIES," filed on Dec. 1, 2022, which is hereby incorporated by reference herein in its entirety.

COPYRIGHT NOTICE

FIELD OF THE TECHNOLOGY

The present disclosure generally relates to the field of replacement parts and, more specifically, to an apparatus and a system for seat replacements for vehicles with multiple driving modes.

DESCRIPTION OF THE RELATED ART

Various vehicles frequently come equipped with plastic covered, foam cushioned seats. Due to continued exposure to the elements, i.e. sun, rain, and snow, the plastic materials that make up the seat covers begin to crack, tear, and generally disintegrate. This disintegration may be at least partially due to water moisture and other weather conditions. Once a crack develops in the cover, water will seep through to collect in the foam of the seat where it can cause even more damage. As such, replacement of the original seats can be excessively expensive and finding the replacement of original seats may be difficult due to availability.

Further, businesses that produce alternative seats often charge more in excess than the seat costs to manufacture. Similarly, specialty fabrication shops typically charge more when a seat is needed, especially for older vehicles that are no longer in production.

Therefore, what is needed is an apparatus and a system for replacement seats for vehicles with multiple driving modes.

SUMMARY

In an embodiment, a device for allowing a user to ride in a vehicle is provided. The device may include: a seat unit having one or more portions of foam materials; one or more accessory units to support the functionality of the seat unit; and one or more seat configurations to attach the seat unit to the vehicle, and wherein the device has at least one driving mode within a group: electric vehicle (EV) mode, and a hybrid vehicle (HV) mode.

In another embodiment, an apparatus for allowing a user to ride in a vehicle is provided. The apparatus may include: a seat device having one or more portions of foam materials; one or more accessory units to support the functionality of the seat device; and one or more seat configurations to attach the seat device to the vehicle, and wherein the apparatus has at least one driving mode within a group: electric vehicle (EV) mode, and a hybrid vehicle (HV) mode.

In yet another embodiment, a system for allowing a user to ride in a vehicle is provided. The apparatus may include: a seat device having one or more portions of foam materials; one or more accessory units to support the functionality of the seat device; and one or more seat configurations to attach the seat device to the vehicle, and wherein the system has at least one driving mode within a group: electric vehicle (EV) mode, and a hybrid vehicle (HV) mode.

In still another embodiment, a means for allowing a user to ride in a vehicle is provided. The means may include: a means for supporting the user riding in a vehicle; a means for supporting the functionality of a seat device; and a means for attaching the seat device to the vehicle; and wherein the means has at least one driving mode within a group: electric vehicle (EV) mode, and a hybrid vehicle (HV) mode.

BRIEF DESCRIPTION OF THE DRAWINGS

The present invention is described in detail below with reference to the attached drawing figures, which are incorporated by reference herein and wherein.

DETAILED DESCRIPTIONS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent application, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application (other than the language of the claims). To the extent that any term recited in the claims at the end of this patent application is referred to in this patent application in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1A:
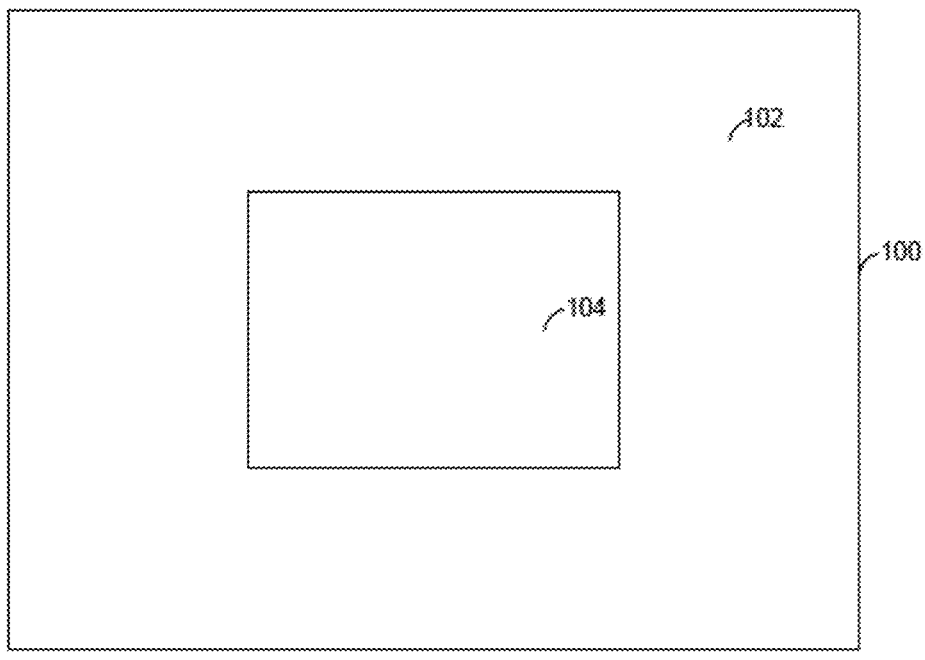
FIG. 1A is a block diagram illustrating an exemplary embodiment of the invention.
Figure 1B:
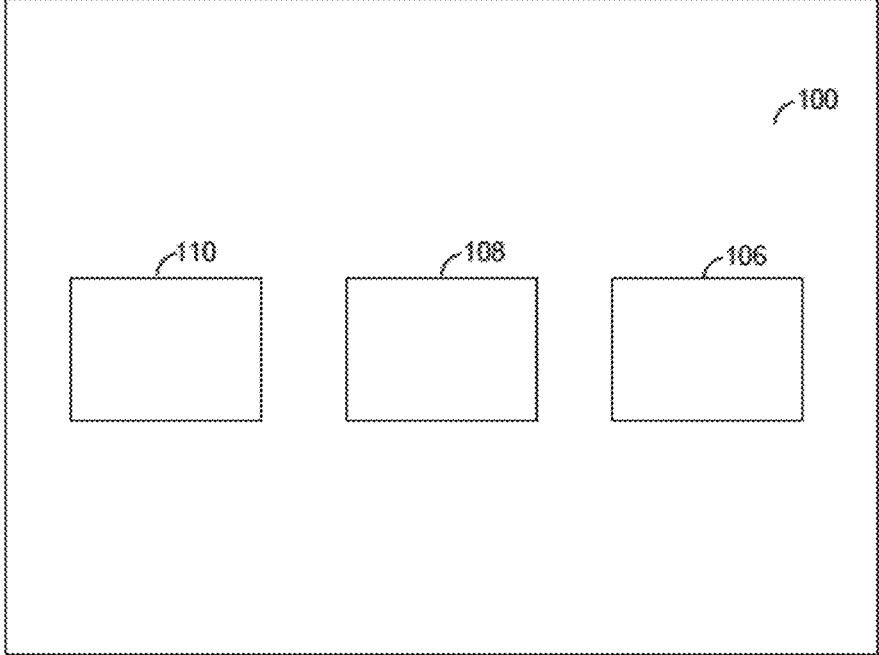
FIG. 1B is a block diagram in accordance with another exemplary embodiment of the invention.

FIGS. 1A and 1B illustrates a block diagram 100 in accordance with an exemplary embodiment of the invention. As shown in FIG. 1A, the seat device 100 may be made of one or more portions of the pressed and/or molded materials. In some embodiments, the pressed and molded seat device 100 may include an outer layer 102 surrounding a core 104 of resilient foam material. In some embodiments, the seat device 100 may include one or more seat configurations such as a rectangular configuration, a circular configuration, a cylindrical configuration, or any configuration known to those skilled in the art. As shown in FIG. 1B, the seat device 100 may include one or more seat configurations. In some embodiments, the one or more seat configurations may include a rear end piece 106, a central portion 108, and a front piece 110. In another embodiment, the seat configurations may include the seat device 100 being tapered partially or tapered completely at the front piece and may have slightly curved outer edges to enable the seat device 100 to, temporarily or permanently, overlay, attach, or affix to a seat 204 of a vehicle 206. In another embodiment, the seat device 100 may be removed from a seat 204.

Figure 2:
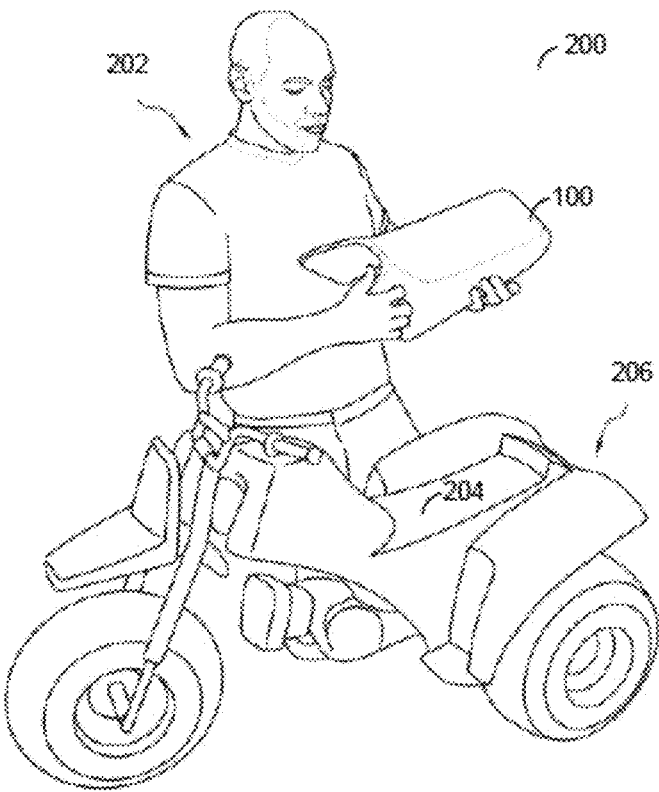
FIG. 2 is a system block diagram with a vehicle in accordance with another exemplary embodiment of the invention.

FIG. 2 illustrates a system block diagram 200 in accordance with another exemplary embodiment of the invention. As shown in FIG. 2, a user 202 may use the seat device 100 to overlay a seat 204 on a vehicle 206. In some embodiments, the vehicle 204 may be an all-terrain vehicle (ATV).

Figure 3:
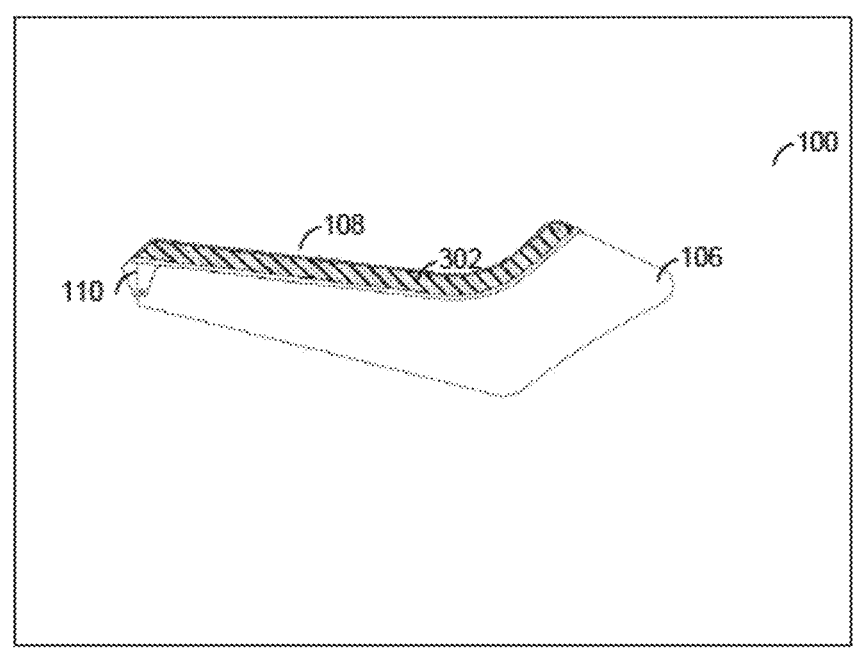
FIG. 3 is a block diagram in accordance with another exemplary embodiment of the invention.

FIG. 3 illustrates a block diagram 100 in accordance with another exemplary embodiment of the invention. As shown in FIG. 3, the seat device 100 may include one or more accessory units 302 to support the functionality of the seat device 100. In some embodiments, the accessory units 302 may include one or more components, compartments, openings, vents, and segments for expelling particles or debris that accumulates during a vehicle ride in association with the rear end piece 106, the central portion 108, and the front piece 110.

Figure 4:
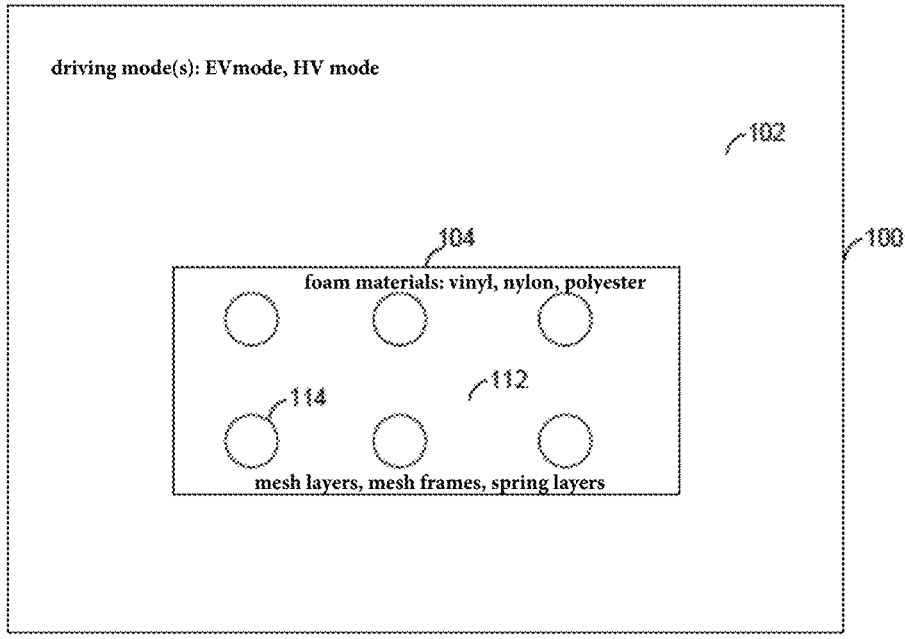
FIG. 4 is a block diagram illustrating a seat foam application in accordance with another exemplary embodiment of the invention.

FIG. 4 illustrates a block diagram 100 in accordance with another exemplary embodiment of the invention. As shown in FIG. 4, the seat device 100 may include an outer layer 102 surrounding a core 104 with one or more resilient foam materials 112. The resilient foam materials 112 may be made of one or more of the following pressed and/or molded materials: leather, neoprene, suede, vinyl, nylon, polyester, or any known material known by those skilled in the art. The resilient foam materials 112 may comprise a material composition in the range from 0% to 100% of any the one or more pressed and/or molded materials. In some embodiments, the resilient foam materials 112 may include one or more foam units 114. The foam units may include one or more mesh frames, mesh layers, shock absorbing layers, moisture absorbing layers, and spring layers that compress and/or decompress based on the weight of a load.

In some implementations, seat device 100 may be made of one or more of the following pressed and/or molded materials: leather, neoprene, suede, vinyl, nylon, polyester, or any known material known by those skilled in the art. The seat device 100 may comprise a material composition in the range from 0% to 100% of any the one or more pressed and/or molded materials.

In another embodiment, the seat device 100 may include a seat cover, a seat cushion, a seat replacement unit, or any device known by those skilled in the art. The seat device 100 may have a length, a width, or a height in the range of 1 inches to 100 inches, respectively. In some embodiments, the seat device 100 may have a length, a width, or a height in the range of between 13-17 inches, between 7-12 inches, and between 1-5 inches, respectively.

In some embodiments, the system may include a vehicle 206. The vehicle 206 may include one or more all-terrain vehicles (ATVs), snowmobiles, motorcycles, mopeds, off road vehicles (ORVs), four wheelers, golf carts, or any vehicles known by those skilled in the art.

In another embodiment, the central portion 108 may include a pair of hinges (not shown) pressed there into to form opposite sides that will flex relative to a center area. The front piece 110 may include a pair of spaced apart hinges (not shown) pressed there into to form opposite sides that will flex relative to a center area. The rear end piece 106 may include a pair of spaced apart hinges (not shown) interconnecting opposite sides with a center area. The hinges of the central portion 108 may connect to the hinges of the front piece 110 and the rear piece 106.

In some embodiments, the seat device 100 may include a front piece 110 that may include a leading edge that can be curved to allow the front piece 110 to fit around a gas can filler spout (not shown) and a gas cap (not shown) of a vehicle 206.

In another embodiment, the system may include one or more straps (not shown) that are partially or completely attachable to each of the sides of the vehicle 206 and can serve as a device for securing the seat device 100 in place overlying the seat 204 of a vehicle 206. In some embodiments, the straps may be secured to any available frame (not shown) or housing component (not shown) of the vehicle 206.

In yet another embodiment, the seat device 100 may include outer sides of the front piece 110, central portion 108, and rear piece 106 that may be interconnected or separated. In other embodiments, the seat device 100 may be positioned to overlay a vehicle seat 204 such that the outer sides protect the sides of the seat 204.

In another embodiment, an apparatus may allow for water to fall onto the seat device 100. The seat device 100 may be used to direct water into a pair of parallel grooves that extend through the central areas of the front and rear pieces of a cushion. The collected water may be then directed from the central areas through spaced apart transverse grooves connecting the grooves with the hinges. Thereafter, the water may then be directed along the hinges if the side panels are not bent over sides of a vehicle seat 204 or past the hinges and off the seat device 100. If no water is present, the grooves may allow air flow therethrough. In some embodiments, the foam filled portions on opposite sides of the grooves may be positioned beneath the buttocks of a user and provide additional cushioning to the original seat and/or additional comfort to the user.

In some implementations, a system may include a molded foam seat device that includes an upper surface having a left upper side, a right upper side, a forward upper side, and an aft upper side, and a lower surface having a left lower side, a right lower side, a forward lower side, and an aft lower side. The molded foam seat device may include a rubberized material that forms a watertight seal. This seal may be used to protect a battery of a vehicle. The molded foam seat device may include a cover that is weather resistant. The cover may include a smooth surface for providing hip and buttock comfort and support of a rider. The molded foam seat device may include a polyurethane high density molded foam. The polyurethane high density molded foam may be compression resistant to prevent permanent deformation caused by weight of a rider.

In another embodiment, the system may include a mesh seat material that includes holes through which water, snow, dust, and other small particles may pass through. By allowing such particles to pass through the seat 204, the particles may be prevented from building up on the seat. Additionally, an air gap may be provided below the mesh seat material. The air gap may open up to the ambient environment so that particles that pass through the mesh seat material are expelled from the vehicle 206.

In yet another embodiment, the apparatus may include one or more cargo storage compartments or one or more attachment locations to carry additional items or cargo. The compartments or attachments may have a rectangular, cylindrical, or circular shape. The compartments or attachments may have the dimensions of height, length, width, depth, diameter, respectively, in the ranges of 0-100 mm and/or 0-100 inches.

In still another embodiment, the system may include an electric vehicle which comprises a front motor for driving a front wheel; a rear motor for driving a rear wheel; a target torque determiner for determining a target torque of the front motor and a target torque of the rear motor, based on at least a displacement amount of an accelerator operation member operated by a driver; and a motor controller for controlling the front motor and the rear motor to cause the front motor to output the target torque and the rear motor to output the target torque.

In yet another embodiment, the system may include a utility vehicle includes right and left front wheels attached with balloon tires (low-pressure tires), right and left rear wheels attached with balloon tires (low-pressure tires), and a vehicle body from which the wheels and are suspended. A cabin space for passengers is provided in a center portion of the vehicle body in a forward and rearward direction (lengthwise direction of the utility vehicle). A bench seat (driver seat) which is laterally elongated is provided in a substantially center portion of the wheel bases of the front and rear wheels. As used herein, the utility vehicle refers to a multi-purpose vehicle, for example, a golf cart, a farming truck, etc.

The front wheels of the utility vehicle are steering wheels and are turned to the right or to the left according to driver's steering of the handle. The handle is supported on a handle post extending upward from the dash board such that it is tilted slightly rearward. Below the handle, an accelerator pedal and a brake pedal are provided. The driver seated on a left portion of the seat can depress the accelerator pedal or the brake pedal, while gripping the handle. A side brake lever is provided in the vicinity of the left end of the seat to allow the driver to easily operate the side brake lever with a left hand.

The front portion of the vehicle body which is forward relative to the cabin space is covered with a hood extending forward from the upper end of the dash board. Below the hood, there are provided front suspension devices which suspend the right and left front wheels such that the right and left front wheels are vertically pivotable, and a steering device for turning the front wheels according to the driver's steering of the handle. In addition, below the hood, there is provided a drive system for actuating the front wheels by an electric front motor (front motor).

A floor panel extends rearward from the lower end of the dash board in the cabin space. A cabin frame is provided above the floor panel. The cabin frame serves as a roll cage (ROPS). In the present embodiment, a substantially left part of a space surrounded by the cabin frame is a space for the driver. As described above, the handle is attached on the left portion of the dash board. In addition, driving operation devices such as a key switch, a mode input device, and the like, are attached on the left portion of the dash board and positioned to enable the driver to manipulate them easily.

The key switch is a main switch for turning ON/OFF a power supply of the utility vehicle. The mode input device is operated by the driver to select a driving mode of the utility vehicle. Exemplary driving modes are an electric vehicle (EV) mode in which the utility vehicle drives only by electric power supplied from a battery unit (Bat.), and a hybrid vehicle (HV) mode in which the utility vehicle receives electric power from an engine electric generator (E/G), in addition to the battery electric power, as described later, but another driving mode may be used. The mode input device may be implemented by, for example, a press button, a toggle switch, or a rocker switch.

A cargo bed is provided behind and in close proximity to the cabin space. Below the cargo bed, there are provided rear suspension devices which suspend the right and left rear wheels such that the right and left rear wheels are vertically pivotable, and a drive system for actuating the rear wheels by an electric rear motor (rear motor). Below the cargo bed, an engine room (not shown) is provided, and accommodates the engine electric generator, and motor drivers and for controlling electric power supply to the front motor and the rear motor.

—Configuration of Drive Control System—

The utility vehicle is a four-wheel-drive vehicle in which the front wheels are actuated by the front motor and the rear wheels are actuated by the rear motor. Note that a front wheel drive system for actuating the front wheels is not coupled mechanically to a rear-wheel-drive system for actuating the rear wheels. A driving power of the front motor is transmitted to the right and left front wheels via a front axle having a reduction gear pair and a differential gear mechanism and a pair of drive shafts. Likewise, a driving power of the rear motor is transmitted to the right and left rear wheels via a rear transaxle and a pair of drive shafts.

A service brake constituted by, for example, a drum brake is provided for each of the front wheels and the rear wheels. In response to the driver's depressing operation of the brake pedal, a hydraulic brake pressure generated in a master cylinder is fed to each of the service brakes corresponding to the right and left front wheels and to each of the service brakes corresponding to the right and left rear wheels, and a braking force is applied to the front wheels and the rear wheels. In the present embodiment, as the service brakes for the front wheels and the rear wheels, drum brake units are used, which achieves cost reduction.

The motor drivers for actuating the front and rear motors, respectively, are accommodated below the cargo bed as described above. The battery unit for supplying the electric power to the motor drivers is accommodated in the cabin space, below the seat, for example. The front motor driver (FMD) converts DC power into three-phase AC power and supplies the three-phase AC power to the front motor via three-phase lines. The rear motor driver (RMD) converts DC power into three-phase AC power and supplies the three-phase AC power to the rear motor via three-phase lines. The motors are constituted by, for example, three-phase induction electric motors, and each of them is a motor/generator (M/G) which is capable of switching between a motor operation and a power generation operation.

In the present embodiment, the motor drivers have basically the same configuration. Therefore, the front motor driver will be described in detail. Although not depicted in detail, the front motor driver includes an inverter constituted by a three-phase (u-phase, v-phase, w-phase) bridge circuit, and a controller for controlling the ON/OFF operation of each switching element (IGBT, etc.). The controller controls the inverter by, for example, PWM (pulse-width modulation) control so that the inverter converts the DC power supplied from the battery unit into AC power and outputs the AC power with a phase difference of 120 degrees through output terminals of u-phase, v-phase and w-phase. The controller also controls the amplitude and frequency of the AC power.

By the AC power supplied from the front motor driver in the above manner, the front motor is actuated, to drive the right and left front wheels via the transaxle and the drive shafts. In the front motor driver, the controller performs the PWM control of the inverter, to control the amplitude and frequency of the AC power, and hence the output torque and output rotational speed of the front motor, i.e., the driving torque and rotational speed of the front wheels. In the same manner, in the rear motor driver, the controller performs the PWM control of the inverter, to control the amplitude and frequency of the AC power, and hence the driving torque and output rotational speed of the rear motor, i.e., the driving torque and rotational speed of the rear wheels.

When the utility vehicle is accelerated, during driving of the utility vehicle, the output torque and rotational speed of the front motor and the output torque and rotational speed of the rear motor are increased by the front motor driver and the rear motor driver, respectively, in response to at least the degree (accelerator displacement amount or level) to which the accelerator pedal is depressed by the driver, as described later. As a result, the driving torque of the front wheels and the driving torque of the rear wheels increase, the rotational speeds of them, and hence the vehicle speed of the utility vehicle increase.

When the utility vehicle is decelerated, the output torque and rotational speed of the front motor and the output torque and rotational speed of the rear motor are decreased by the front motor driver and the rear motor driver, respectively. Thereby, the front motor is rotated by the force applied by the front wheels and the rear motor is rotated by the force applied by the rear wheels to perform regenerative braking. In regenerative braking, the front motor and the rear motor operate as AC electric generators. The AC power generated in the front motor is sent to the inverter via the AC lines and is converted into the DC power charged into the battery unit, while the AC power generated in the rear motor is sent to the inverter via the AC lines and is converted into the DC power charged into the battery unit.

The inverter of the front motor driver and the inverter of the rear motor driver are coupled together via first DC lines and are coupled to the battery unit via second DC lines connected to a portion of the first DC lines. In this way, the DC power is allowed to flow among the inverter, the inverter, and the battery unit according to terminal voltages, respectively, via the first DC lines or the second DC lines coupling the inverters and the battery unit.

The battery unit is a secondary battery pack of, for example, a lead storage battery, a nickel-metal hydride battery, or a lithium ion battery. The battery unit is composed of a plurality of battery modules connected in series or in parallel, and provides a voltage and capacity required for actuating the utility vehicle 1. A terminal voltage of the whole battery unit is set to, for example, 50V. To protect passengers from a high voltage, the DC lines are in a floating condition in which they are insulated from a body earth of the utility vehicle.

In the present embodiment, for example, a current sensor and a voltage sensor are attached on the second DC lines to detect a value of a current and terminal voltages during charging/discharging of the battery unit. As described later, in the present embodiment, the output of the current sensor and the output of the voltage sensor are sent to the controller of the front motor driver, which calculates the value of a state of charge (SOC), etc., based on the detected current value and the detected voltage value.

In the present embodiment, the utility vehicle is a hybrid vehicle, which includes the engine electric generator for supplying the electric power to the front motor, the rear motor and the battery unit. For example, the engine electric generator includes an electric generator and a reciprocating engine and has a unitary structure in which the electric generator is coupled integrally with the end portion of a crankshaft of the reciprocating engine. The engine is started according to the value of the SOC of the battery unit and actuates the electric generator.

For example, the electric generator is a three-phase induction electric generator which is capable of switching between a motor operation and a power generation operation. The electric generator is a starter/generator (S/G) which functions as a starter of the engine during the motor operation. The electric generator is coupled to an inverter of an S/G controller (S/GC) via three-phase (u-phase, v-phase, w-phase) AC lines. The inverter is coupled to the first DC lines via third DC lines, respectively. At the start of the engine, the inverter is controlled by the controller to supply the three-phase AC power to the electric generator via the AC lines, thereby allowing the electric generator to operate as a motor.

Upon the engine starting, the electric generator actuated by the engine generates AC power, which is sent to the inverter of the S/G controller, via the AC lines. The inverter converts the AC power into DC power, which is sent to the third DC lines. Then, the DC power flows to the first DC lines through the third DC lines. The inverter of the front motor driver and the inverter of the rear motor driver convert the DC power into the three-phase AC power, which is used to actuate the front motor and the rear motor. The DC power flowing through the first DC lines and then the second DC lines is charged into the battery unit.

In the present embodiment, the engine of the engine electric generator is, for example, a gasoline engine, and includes a carburetor including a throttle valve which throttles a flow of intake air. By changing the opening degree of the throttle valve, the amount of an air-fuel mixture suctioned into a cylinder of the engine changes, and an engine driving power output changes. An actuator for opening and closing the throttle valve is controlled by the controller of the S/G controller. The controller also controls feeding of fuel to the carburetor, and ignition of the air-fuel mixture in the cylinder.

As described above, in the present embodiment, in the engine room below the cargo bed, the engine electric generator, the rear motor, and the rear transaxle are accommodated. In addition, the front motor driver, the rear motor driver, and the S/G controller are accommodated in the engine room. Because of this layout, by displacing the cargo bed upward, maintenance of mechanical components such as the engine electric generator, the rear motor, and the rear transaxle is carried out easily, and maintenance of the motor drivers and the S/G controller which are subjected to a high voltage, is carried out easily. The engine electric generator, which tends to elevate its temperature, is positioned at a right part of the engine room, and the motor drivers, and the S/G controller are positioned at a left part of the engine room in order to prevent the motor drivers, and the S/G controller from being damaged by heat radiated from the engine electric generator.

—Driving Action Control of Utility Vehicle—

In the driving action control of the utility vehicle which is performed by the drive control system having the above described configuration, the motors\are controlled by using the inverters of the front and rear motor drivers, respectively, and the engine electric generator is activated as necessary. In the present embodiment, the controller of the front motor driver and the controller of the rear motor driver are connected interactively to the controller of the S/G controller via CAN (control area network), which realizes total control.

To be specific, each of the three controllers is basically constituted by a known microcontroller, and includes a CPU for executing programs, memories such as RAM or ROM, I/O bus, etc. In the present embodiment, hereinafter, it is assumed that the controller of the front motor driver is a master controller, and performs predetermined calculation based on the outputs of sensors indicating vehicle states. Then, the controller (hereinafter referred to as master controller) outputs control commands to the controller of the rear motor driver and to the controller of the S/G controller, respectively.

To be specific, the master controller receives, as inputs of information indicating the driver's operation, a signal from an accelerator sensor for detecting the degree (accelerator displacement amount) to which the accelerator pedal has been depressed by the driver, a signal from a brake switch a for detecting the degree (brake displacement amount) to which the brake pedal has been depressed by the driver, a signal from the key switch, a signal from the mode selection device, etc. In addition, the master controller receives as inputs a signal from the current sensor attached on the second DC line, a signal from the voltage sensor attached on the second DC line, a signal from an encoder built into the front motor, and a signal from a temperature sensor (e.g., temperature sensor for detecting a hall IC temperature of the front motor) built into the front motor, etc.

A signal from an encoder built into the rear motor is inputted to the controller of the rear motor driver, and then is sent from the controller to the master controller as a signal indicating the rotational speed of the rear motor. In the above described manner, the sensors, the switches and others for controlling driving action of the utility vehicle are coupled to the master controller directly or indirectly via CAN. The signals from the sensors and the switches are inputted to the master controller.

The master controller controls the motors by using the inverters based on the signals from the sensors and the switches so that the utility vehicle drives, in response to the driver's operation. The master controller includes a target torque determiner for determining a target torque of the front motor and a target torque of the rear motor, based on at least the signal from the accelerator sensor, the signal from the brake switch, the signal from the encoder built into the front motor, and the signal from the encoder built into the rear motor.

The master controller includes a driving power controller which performs PWM (pulse-width modulation) control of the inverter based on a target torque value of the front motor so that the front motor outputs the target torque. The target torque determiner outputs a target torque value of the rear motor to the controller of the rear motor driver. Receiving the target torque value, the controller controls the inverter so that the output torque of the rear motor reaches the target torque.

The inverter of the motor driver controls the amplitude or the like of the AC power supplied to the front motor based on the target torque value determined by the target torque determiner of the master controller, while the inverter of the motor driver controls the amplitude or the like of the AC power supplied to the rear motor based on the target torque value determined by the target torque determiner of the master controller. In this way, the torque of the front motor and the torque of the rear motor are individually controlled. In other words, the inverter of the motor driver and the inverter of the motor driver respectively operate as motor controllers for controlling the front motor and the rear motor, respectively so that the front motor and the rear motor output their target torques.

In the present embodiment, the master controller includes a mode selector for selecting a driving mode of the utility vehicle, based on a signal from the mode selection device, the value of the SOC of the battery unit, etc. The mode selector fundamentally selects the EV mode or the HV mode based on the signal from the mode input device. The mode selector selects the HV mode if the value of the SOC of the battery unit is lower than a predetermined lower limit value. The mode selector outputs a mode selection command to the S/G controller. Receiving this mode selection command, the controller controls the operation of the engine electric generator.

The engine electric generator is attached with an engine speed sensor for detecting the engine speed of the engine and the rotational speed of the electric generator. The signal output from the engine speed sensor is input to the controller of the S/G controller. Based on the signal from the engine speed sensor, the controller controls the opening degree of the throttle valve of the engine so that the engine speed reaches a target engine speed. The target engine speed may be set to a value near a rated engine speed preliminarily but may be provided as a control command from the master controller based on the vehicle state of the utility vehicle.

Hereinafter, a specific procedure of the driving action control of the utility vehicle of the present embodiment will be described. When the key switch of the utility vehicle is turned ON, the contactors are closed, and the electric power starts to flow between the battery unit and the motor drivers. Thereupon, the control procedure starts. This control procedure is repeated until the key switch is turned OFF.

—Driving Action Control of Front and Rear Motors—

After the start, the master controller receives the signals from the sensors and the switches, and reads data from a predetermined area of the memory as necessary. The master controller determines whether or not the accelerator pedal has been depressed based on the signal from the accelerator sensor (accelerator ON?). If NO, the process moves to future steps as described later. On the other hand, if YES, the master controller determines whether or not a condition (hereinafter referred to as an economical driving condition) used for driving the utility vehicle by using only either one of the motors is met.

Further, the master controller determines that the economical driving condition is met at least either when a remaining driving distance of the utility vehicle (a distance over which the utility vehicle is going to travel from now on) is not more than a preset distance, or the displacement amount of the accelerator pedal is not more than a preset amount (low load state). For example, the remaining driving distance may be calculated, based on the value of the SOC of the battery unit, the amount of fuel oil which can be supplied to the engine, or a cumulative driving distance in a period which passes from a time point when the utility vehicle was fed with the fuel oil most recently to a current time.

The above stated low load state refers to a state in which either one of the front and rear motors is actuated to lessen a driving power loss and suppress heat generation in the motors, and the inverters, in view of a mechanical driving loss, or efficiency of the motors, and the inverters. This state is found preliminarily from an experiment or the like. If it is determined that the economical driving condition is met (YES), the target torque determiner sets the target torque of one of the front and rear motors to zero. The target torque determiner determines the target torque of the other of the front and rear motors with reference to a map similar to a driving torque map as described below (determine target torque for economical driving).

When the utility vehicle is driven by using only one of the front and rear motors as described above, economical driving with a lesser energy loss is realized, but drivability may be limited. As a solution to this, if the displacement amount of the accelerator pedal is greater than a predetermined amount even when the remaining driving distance is not more than the preset distance, the front and rear wheels may be driven by using both front and rear motors. By driving both front and rear wheels as necessary, even in the middle of the economical driving, a driving mobility unique to the four-wheel-drive vehicle is attained.

On the other hand, if it is determined that the economical driving condition is not met (NO), the target torque determiner determines the target torque of the front motor and the target torque of the rear motor, with reference to driving torque maps electronically stored in a memory. The driving torque maps contain suitable target torque values of the front motor and target torque values of the rear motor, respectively corresponding to accelerator displacement amounts and vehicle speeds, for example, which values are found by experiment or the like. The vehicle speed may be calculated, based on the signal from the encoder of the front motor and the signal from the encoder of the rear motor.

In the driving torque maps, the driving torque of the front motor and the driving torque of the rear motor may be set to different values, according to the vehicle states of the utility vehicle. As the vehicle states, the vehicle speed, acceleration, deceleration, lateral acceleration indicating how the utility vehicle is turning, etc., may be used. The vehicle states may include the displacement amount of the accelerator pedal, the displacement amount of the brake pedal, the displacement speed of the accelerator pedal, the displacement speed of the brake pedal, a slip state of the front wheels, a slip state of the rear wheels, etc. According to these vehicle states, the magnitude of the driving torque of the front wheels and the magnitude of the driving torque of the rear wheels may be changed, thereby implementing suitable driving action control and improving the driving feeling.

To be specific, in the driving torque maps, the target torque of the front wheels and the target torque of the rear wheels may be set to greater values as the accelerator displacement amount becomes greater. Or, the target torque of the front wheels and the target torque of the rear wheels may be set to relatively greater values as the vehicle speed becomes higher, in view of a higher driving resistance. By comparison, when the vehicle speed is higher, the target torques may be set to relatively smaller values according to an increase in the vehicle speed, because there arises a need for suppressing the attitude of the utility vehicle from becoming unstable.

For example, the target torque value read from the driving torque map may be greater for the rear wheels side and smaller for the front wheels side as the acceleration of the utility vehicle becomes greater. During acceleration, vertical load (contact or ground load) at the rear wheels side increases because of shifting of the load. Therefore, if the ratio of the allocation of the torque applied to the rear wheels side is set greater, the driving mobility of the utility vehicle can be enhanced, and the attitude of the utility vehicle can be stabilized. It may be determined that the utility vehicle is accelerated, based on, for example, the accelerator displacement amount, or the fact that an increase rate of the displacement amount is not less than a predetermined amount.

The target torque value read from the driving torque map may be changed based on how the utility vehicle is turning (state of turning of the utility vehicle). For example, the torque of the front motor may be set greater when the utility vehicle is turning. By doing so, the driver can feel that the utility vehicle is steered effectively, and enjoy an improved driving feeling. Note that, if the vehicle speed is higher than a predetermined value, the torque of the rear motor may be set greater, to stabilize the attitude of the utility vehicle 1 being turning.

It may be determined how the utility vehicle is turning based on the degree to which the handle is steered by the driver, or based on lateral acceleration. In that case, the utility vehicle may be provided with a sensor for detecting a steering angle of the handle or a sensor for detecting the lateral acceleration. Or, the utility vehicle may be provided with a sensor for detecting a rotational speed difference between the right and left wheels (either one of or both of the front wheels and the rear wheels), and it may be determined how the utility vehicle is turning, based on the output of the sensor.

The rotational speed of the front motor and the rotational speed of the rear motor may be detected based on the signal from the encoder and the signal from the encoder, respectively. If one of the front wheels and the rear wheels slip, the target torque value of the wheels which are slipping may be decreased, and the target torque value of the wheels which are not slipping may be increased, either one of which may occur or both of which may occur. By doing so, the slip of the wheels can be suppressed and the driving mobility of the utility vehicle can be enhanced.

In brief, if one of the front wheels and the rear wheels slip, at least either decreasing the target torque value of the wheels which are slipping, or increasing the target torque value of the wheels which are not slipping, is performed. In other words, the target torque value of one of the wheels is set smaller than the target torque value of the other wheels. In the same manner, if both of the front wheels and the rear wheels are slipping, the target torque value of the wheels which are slipping with a greater slip ratio may be set smaller than the target torque value of the wheels which are slipping with a smaller slip ratio. In brief, the ratio of the allocation of the driving torque in the utility vehicle may be set greater for the wheels with a smaller slip ratio.

After the target torque of the front motor and the target torque of the rear motor are determined, the front and rear motors are controlled by using the inverter of the front motor driver and the inverter of the rear motor driver, respectively so that the front and rear motors output the determined target torques, respectively (drive control of motor). Thereby, the front motor and the rear motor are respectively independently supplied with the electric power and their torques are independently controlled. As a result, driving mobility unique to the four-wheel-drive vehicle can be achieved even in a road surface condition, for example, a snowy road surface or a sandy road surface, in which a friction coefficient is very low.

—Control of Engine Electric Generator—

In another embodiment, the mode selector determines whether or not the EV mode should be selected, based on the signal from the mode input device, the value of the SOC of the battery unit, etc. (EV mode?). It is determined as YES when the EV mode is selected by the driver using the mode input device and the value of the SOC of the battery unit is not less than a predetermined lower limit value. On the other hand, it is determined as NO when the HV mode is selected by the driver using the mode input device and the value of the SOC of the battery unit is less than the predetermined lower limit value.

If it is determined as YES and the mode selector selects the EV mode, and if it is determined that the engine electric generator is activated to generate electric power (YES), the mode selector sends an engine stop command to the controller of the S/G controller, to stop the operation of the engine electric generator. In response to this engine stop command, the controller fully closes the throttle valve of the engine and stops the feeding of the fuel and the ignition of the air-fuel mixture. As a result, the running of the engine stops.

On the other hand, if it is determined as NO and the mode selector selects HV mode, and if it is determined that the engine is in a stopped state (YES), the mode selector sends an engine start command to the controller of the S/G controller, to start the engine. In response to this engine start command, the controller causes the electric generator of the engine electric generator to operate as the motor. Thereby, the engine starts cranking, feeding the fuel, and the ignition of the air-fuel mixture. In this way, the engine starts.

When the EV mode is selected (YES) and the engine is in a stopped state (NO), the engine maintains its state. When the HV mode is selected (NO) and the engine is running (NO), the engine maintains its state.

As described above, the control mode switches to the HV mode, as necessary, in which case the engine electric generator is activated to supplementarily supply the electric power to the front and rear motors. In the HV mode, reduction of the value of the SOC of the battery unit is lessened, and the distance over which the utility vehicle is going to drive from now can be increased significantly. Since the control mode switches to the HV mode while monitoring the value of the SOC of the battery unit, the battery unit is prevented from discharging to an excessive level, and thus, the life of the batteries can be extended. Since the EV mode or the HV mode is fundamentally selected in response to the driver's operation of the mode input device, the driver's intention is reflected well in selection of the mode.

—Regenerative Braking—

Next, a control procedure of regenerative braking will be described. If NO (accelerator OFF) is determined, it is determined whether or not the utility vehicle is in a stopped state. For example, if the vehicle speed is lower than a predetermined small value (e.g., 2-3 km/h), it is determined that the utility vehicle is in a stopped state (YES), and the process returns to starting phase. On the other hand, if it is determined that the vehicle speed is not lower than the predetermined value (NO), it is determined whether or not the brake pedal has been depressed by the driver, based on the signal from the brake switch (brake ON?).

If it is determined as NO (brake OFF), it may be estimated that the driver has released the accelerator pedal but does not depress the brake pedal yet. In this case, the target torque determiner sets the corresponding target torque to a negative value such that its absolute value is a relatively small value to achieve a braking torque substantially equal in magnitude to a typical engine braking force so that at least one of the front motor and the rear motor is placed in a regenerative braking mode.

Hereinafter, for clarity of description, the negative target torque in the regenerative braking is referred to as a target braking torque and its value is assumed to be an absolute value. For example, the value of the target braking torque corresponding to brake-OFF, which is substantially equal in magnitude to the typical engine braking force, is found by an experiment, etc., and may be electronically stored in the memory of the master controller. The value may be set to a constant value, or may be set in the form of a map or a table such that the value is greater as the vehicle speed is higher, or smaller as the vehicle speed is higher.

The value of the target braking torque corresponding to brake-OFF may be set different between the front motor and the rear motor according to the vehicle states of the utility vehicle including the vehicle speed. For example, when the vehicle speed is not lower than the predetermined value, the target braking torque may be set to an equal value for the front motor and the rear motor, while when the vehicle speed is lower than the predetermined value, the target braking torque of the front motor may be set to a greater value, and the target braking torque of the rear motor may be set to a smaller value, according to a decrease in the vehicle speed. Or, when the vehicle speed is lower than the predetermined value, the target braking torque of the rear motor may be set to zero, and only the front motor may generate the braking torque.

If it is determined as YES (brake ON), the target torque determiner of the master controller determines the value of the target braking torque as a value greater than a value in the state of the brake-OFF. This increases efficiency of the regenerative braking and increases the braking torque applied to the front wheels and the braking torque applied to the rear wheels. Since the front and rear motors have high responsiveness to control, and the regenerative braking torque generated in the motors increases quickly, the driver can feel that the braking force is increasing, upon the driver's operation for depressing the brake pedal.

The value of the target braking torque determined in response to the driver's operation of the brake pedal may be made different between the front motor and the rear motor. For example, the target torque determiner determines the target braking torque of the front motor and the target braking torque of the rear motor, with reference to braking torque maps electronically stored in the memory. These braking torque maps contain suitable braking torque values of the front motor and suitable braking torque values of the rear motor, respectively, corresponding to brake displacement amounts and vehicle speeds, for example, which values are found by experiment or the like.

In the braking torque maps of the front motor and the rear motor, for example, the target braking torque of the front motor may be set greater than the target braking torque of the rear motor, and the target braking torque of the front motor and the target braking torque of the rear motor may increase as the brake displacement amount increases. The target braking torque of the front motor and the target braking torque of the rear motor may be set greater as the vehicle speed is higher.

In the present embodiment, the same drum brake units are used as the service brakes for all of the front and rear wheels. If the ratio of the allocation of the regenerative braking torque to the front motor is set greater as described above, the braking torque applied to the front wheels can be set greater than the braking torque applied to the rear wheels, along with the braking forces generated by the service brakes. This results in a natural braking feeling. In addition, during the braking, the vertical load (ground or contact load) of the front wheels increases because of a shifting of the load. Therefore, if the ratio of the allocation of the braking torque applied to the front wheels is set greater, the attitude of the utility vehicle can be stabilized even in a slippery road surface condition such as a snowy road surface condition. In addition, the kinetic energy can be recovered effectively at the front wheels side where the ground load tends to increase.

In the braking torque maps of the front motor and the rear motor, the values of target braking torques may be set not to change according to the magnitude of the vehicle speed. Or, the ratio of the allocation of the braking torque to the front and rear motors may be changed according to the magnitude of the vehicle speed. For example, the ratio of the allocation of the regenerative braking torque to the front motor may be set greater, as the vehicle speed is higher. Or, the value of the target braking torque of the rear motor may be set to zero, and only the front motor may generate the braking torque when the vehicle speed is not lower than a predetermined value.

Furthermore, the target braking torque value read from the braking torque map may be changed according to the vehicle states of the utility vehicle. For example, the ratio of the allocation of the braking torque to the front motor may be set greater as deceleration of the utility vehicle becomes greater. Or, the ratio of the allocation of the braking torque to the front motor may be set greater when the utility vehicle is turning than when the utility vehicle not turning, in order to stabilize the attitude of the utility vehicle during the braking.

For example, during a state where the brake is OFF, only one of the front and rear motors (preferably front motor) may perform regenerative braking, and thereafter both of the front and rear motors may perform regenerative braking, upon the brake being ON. When both of the motors perform regenerative braking, the magnitude of the braking torque of the front motor may be set comparatively greater.

When the target torque determiner of the master controller determines the target braking torque value of the front motor or the target braking torque value of the rear motor, the front motor is controlled by using the inverter of the front motor driver, and the rear motor is controlled by using the inverter of the rear motor driver (regenerative braking control of the motor). To be specific, at least one of front motor and rear motor rotates by the force applied by the front wheels or the rear wheels, to operate as the AC electric generator. The generated AC power is supplied to the inverter), via the AC lines The inverter converts the AC power into DC power which is charged into the battery unit.

During the above operation, it is determined whether or not the engine electric generator is activated to generate electric power. If YES, the controller of the S/G controller controls the inverter so that the power generation operation of the electric generator is stopped, and the controller controls the throttle valve opening degree of the engine, to gradually decrease the engine speed to an idling engine speed. The power generation operation of the electric generator (engine electric generator) is stopped, to improve efficiency with which the kinetic energy can be recovered by the front motor or the rear motor.

When the utility vehicle is stopped and the vehicle speed is lower than the predetermined value, the engine electric generator may be activated as necessary, to charge the battery unit, if the key switch is not turned OFF after a predetermined time passes.

As described above, in the present embodiment, the utility vehicle includes the electric motors for driving the front wheels and the rear wheels, respectively, the target torque of the front motor and the target torque of the rear motor are determined based on at least the depressing operation of the accelerator pedal, and the front motor and the rear motor are controlled by the front motor driver and the rear motor driver, respectively, to output their target torques.

In a case where one of the front wheels and the rear wheels slip in a slippery road surface condition such as a snowy road surface condition, a desired driving torque is applied to the other wheels which are not slipping, without decreasing the magnitude of the driving torque applied to the wheels being slipping. That is, the driving torque is fundamentally applied to each of the front wheels and the rear wheels, in response to the driver's depressing operation of the accelerator pedal, etc., and as a result, high driving mobility unique to the four-wheel-drive wheel and a natural driving feeling are achieved.

More often than not, the utility vehicle drives in the slippery road surface condition. If a wheel slip occurs, the driving torque is adjusted by the driver's depressing operation of the accelerator pedal. Since the driving torque is applied to each of the front wheels and the rear wheels, in response to the driver's depressing operation of the accelerator pedal, while permitting some slip. Thus, a natural driving feeling is achieved.

In the present embodiment, the ratio of the allocation of the driving torque applied to the front wheels and to the rear wheels in response to the driver's operation is changed in multiple levels according to the vehicle states. Thus, a natural driving feeling is achieved.

In the utility vehicle of the present embodiment, to ensure driving mobility on a sandy road or in a swampy area, the front wheels and the rear wheels are attached with balloon tires, respectively. The balloon tires tend to dent easily and the outer diameter of the wheels tends to change easily. For this reason, in speed control of the motors, a problem associated with a detection error of the wheel speed arises. To correct the error, control would become complicated. However, the preset embodiment is intended for torque control of the motors. Therefore, a problem associated with the detection error will not arise, irrespective of easy control.

In the present embodiment, the front motor and the rear motor drive the right and left front wheels and the right and left rear wheels via the transaxles and (differential gear mechanisms), respectively, which can simplify the control. This is because the ratio of torque allocation in the forward and rearward direction is changed by the control, but torque allocation in the rightward and leftward direction is substantially performed by the differential gear mechanisms.

Furthermore, in the utility vehicle of the present embodiment, the ratio of the allocation of the braking torque applied to the front wheels and to the rear wheels is changed in multiple levels in the braking control. This makes it possible to achieve effective kinetic energy recovery and a natural driving feeling. Moreover, by reducing the capacity of the service brake, cost reduction can be achieved.

OTHER EMBODIMENT

The above embodiment is merely exemplary, and is in no way intended to limit the present invention, its applications and uses. Although the motor is switched between driving of the wheels and regenerative braking in response to ON/OFF of the accelerator pedal in the present embodiment, the present invention is not limited to this. The motor may generate the driving torque when the displacement amount of the accelerator pedal is not less than a reference displacement amount which is a degree to which the accelerator pedal is depressed slightly, and may generate the braking torque by regenerative braking when the displacement amount of the accelerator pedal is less than the reference displacement amount.

In the present embodiment, a rotational speed sensor may be provided to detect the rotational speed of each of the right and left front wheels and the right and left rear wheels, and the vehicle speed of the utility vehicle may be detected based the output of the sensor.

Many different arrangements of the various components depicted, as well as components not shown, are possible without departing from the spirit and scope of the present invention. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. A device for allowing a user to ride in a vehicle comprising:
   a seat unit having one or more portions of foam materials that include one or more foam units; one or more accessory units to support a functionality of the seat unit; and one or more seat configurations to attach the seat unit to the vehicle,
   wherein the seat unit is made of at least three distinct layers of foam materials being comprised of different materials within a group: leather, neoprene, suede, vinyl, nylon, and polyester; and wherein the one or more foam units is made of at least three of: mesh layers, shock absorbing layers, spring layers, and moisture absorbing layers, and wherein the device has at least one driving mode within a group: electric vehicle (EV) mode, and a hybrid vehicle (HV) mode; and a mode input device is implemented by at least one within a group: press button, a toggle switch, and a rocker switch.

2. The device of claim 1, wherein the seat device has a length between 13 and 17 inches and a width between 7-12 inches.

3. The device of claim 1, wherein the foam materials are pressed.

4. The device of claim 1, wherein the seat unit is a seat cushion.

5. The device of claim 1, wherein the seat unit is a seat cover.

6. The device of claim 1, wherein the seat unit is a seat replacement unit.

7. The device of claim 1, wherein the foam materials are resilient.

8. The device of claim 1, wherein the accessory units are compartments.

9. An apparatus for allowing a user to ride in a vehicle comprising:
   a seat device having one or more portions of foam materials that include one or more foam units; one or more accessory units to support a functionality of the seat device; and one or more seat configurations to attach the seat device to the vehicle, wherein the seat device is made of at least three distinct layers of foam materials being comprised of different materials within a group: leather, neoprene, suede, vinyl, nylon, and polyester; and wherein the one or more foam units is made of at least three of: mesh layers, shock absorbing layers, spring layers, and moisture absorbing layers, and wherein the apparatus has at least one driving mode within a group: electric vehicle (EV) mode, and a hybrid vehicle (HV) mode; and a mode input device is implemented by at least one within a group: press button, a toggle switch, and a rocker switch.

10. The apparatus of claim 9, wherein the foam materials are molded.

11. The apparatus of claim 9, wherein the foam materials are pressed.

12. The apparatus of claim 9, wherein the seat device is a seat cushion.

13. The apparatus of claim 9, wherein the seat device is a seat cover.

14. The apparatus of claim 9, wherein the seat device is a seat replacement unit.

15. A means for allowing a user to ride in a vehicle comprising:
   a means for supporting the user riding in a vehicle;
   a means for supporting the functionality of a seat device; and
   a means for attaching the seat device to the vehicle, wherein the seat device is made of at least three distinct layers of foam materials being comprised of different materials within a group: leather, neoprene, suede, vinyl, nylon, and polyester and wherein the seat device includes one or more foam units that are made of at least three of: mesh layers, shock absorbing layers, spring layers, and moisture absorbing layers, and wherein the means has at least one driving mode within a group: electric vehicle (EV) mode, and a hybrid vehicle (HV) mode; and a mode input device is implemented by at least one within a group: press button, a toggle switch, and a rocker switch.

16. The means of claim 15, wherein the means for supporting the user riding in a vehicle is a seat device.

17. The means of claim 15, wherein the means for supporting the functionality of a seat device is one or more accessory units.

18. The means of claim 15, wherein the means for attaching the seat device to the vehicle is one or more straps.

19. The means of claim 15, wherein the vehicle is an all-terrain vehicle (ATV).

20. The means of claim 15, wherein the vehicle is an off road vehicle (ORV).

* * * * *